(12) United States Patent
Dudek

(10) Patent No.: US 7,212,915 B2
(45) Date of Patent: May 1, 2007

(54) APPLICATION OF LINEAR SPLINES TO INTERNAL COMBUSTION ENGINE CONTROL

(75) Inventor: Kenneth P. Dudek, Rochester Hills, MI (US)

(73) Assignee: GM Global Technology Operations Inc., Detroit, MI (US)

( * ) Notice: Subject to any disclaimer, the term of this patent is extended or adjusted under 35 U.S.C. 154(b) by 0 days.

(21) Appl. No.: 11/375,430

(22) Filed: Mar. 14, 2006

(65) Prior Publication Data

US 2006/0235600 A1  Oct. 19, 2006

Related U.S. Application Data

(60) Provisional application No. 60/672,593, filed on Apr. 19, 2005.

(51) Int. Cl.
*G06F 19/00* (2006.01)
*G06G 7/70* (2006.01)

(52) U.S. Cl. ................................. 701/115; 701/102
(58) Field of Classification Search ............... 701/102, 701/101, 115; 123/478, 480
See application file for complete search history.

(56) References Cited

U.S. PATENT DOCUMENTS 4,084,240 A * 4/1978 Lappington ............... 701/102
4,625,697 A * 12/1986 Hosaka ....................... 123/478

* cited by examiner

*Primary Examiner*—Hieu T. Vo
(74) *Attorney, Agent, or Firm*—Christopher DeVries

(57) ABSTRACT

A modeling system for a control parameter of a vehicle comprises a first model that formulates the control parameter in terms of linear spline basis functions, coefficients, and knots. A second model is derived according to the first model, includes coefficients that are derived according to the linear spline basis functions, coefficients, and knots, and forms a linear equation for the control parameter. A memory module stores the linear equation. A control module calculates the control parameter according to the linear equation.

15 Claims, 5 Drawing Sheets

APPLICATION OF LINEAR SPLINES TO INTERNAL COMBUSTION ENGINE CONTROL

CROSS-REFERENCE TO RELATED APPLICATIONS

This application claims the benefit of U.S. Provisional Application No. 60/672,593, filed on Apr. 19, 2005. The disclosure of the above application is incorporated herein by reference.

FIELD OF THE INVENTION

The present invention relates to internal combustion engine control, and more particularly to using linear splines to determine nonlinear behavior of an internal combustion engine.

BACKGROUND OF THE INVENTION

Automotive powertrains require accurate control systems to meet government regulations and customer expectations. Manufacturers of powertrain control systems recognize the benefit of applying analytical control system design methods to the development and calibration of their products. Accurate control systems provide improved performance, reduced variation, and reduced calibration effort.

Analytical control system design applies Control Theory to vehicle systems using differential equation engineering (or difference equation engineering, for discrete time systems). Generally, analytical control system design includes modeling a physical system as a differential equation and analytically determining a new differential equation. The new differential equation is often called the "control law" or "control algorithm." The control law is connected to the system in question to obtain a desired behavior. The desired behavior is often expressed as either a differential equation or some attribute of a differential equation.

The analytic theory of linear differential and difference equations and the design theory for linear control systems are particularly well-suited for systems that can be described by linear, constant coefficient equations. The theory of non-linear differential equations, however, is less helpful for analytic design of control systems. Generally, the theory of non-linear differential equations is largely confined to describing equation properties that can ensure existence, uniqueness, and stability of solutions. As a result, the analytic design theory for non-linear control systems usually involves problems in terms of stability.

"Scheduling" involves using linear system descriptions for non-linear systems by modeling a nonlinear system as a linear system with parameters that are functions of other variables. In other words, linear systems are scheduled to represent non-linear behavior. Scheduling is extremely powerful because it permits the application of linear analysis and design techniques to non-linear systems. Conventional methods for scheduling linear systems include table look-up (i.e. interpolation) scheduling, polynomial scheduling, and "jump" linear scheduling.

In table look-up scheduling, system parameters are interpolated between values stored in a one-dimensional or multi-dimensional table. Scheduling via table lookup can be computationally expensive and does not permit standard least squares identification of table entries. Moreover, the computational expense increases geometrically with the dimension of the scheduling space (i.e. increases with additional scheduling variables). The inability to use least squares identification obscures the relationship between model parameters (as stored in the table entries) and system behavior. This limits the ability of designers to apply extensions of standard linear design theory, such as least squares identification.

In polynomial scheduling, system parameters are polynomial functions of the scheduling variables. In "jump" linear scheduling, system parameters are held constant over a range of the scheduling variables, but can change discretely when crossing into a different range of the scheduling parameters. "Jump" linear scheduling is computationally efficient, and it preserves transparency between system parameters and performance. For example, "jump" linear scheduling permits the use of least squares identification. However, with "jump" linear scheduling, the system behavior can become discontinuous across scheduling boundaries. Such discontinuity can produce undesirable system performance.

SUMMARY OF THE INVENTION

A modeling system for a control parameter of a vehicle comprises a first model that formulates the control parameter in terms of linear spline basis functions, coefficients, and knots. A second model is derived according to the first model, includes coefficients that are derived according to the linear spline basis functions, coefficients, and knots, and forms a linear equation for the control parameter. A memory module stores the linear equation. A control module calculates the control parameter according to the linear equation.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
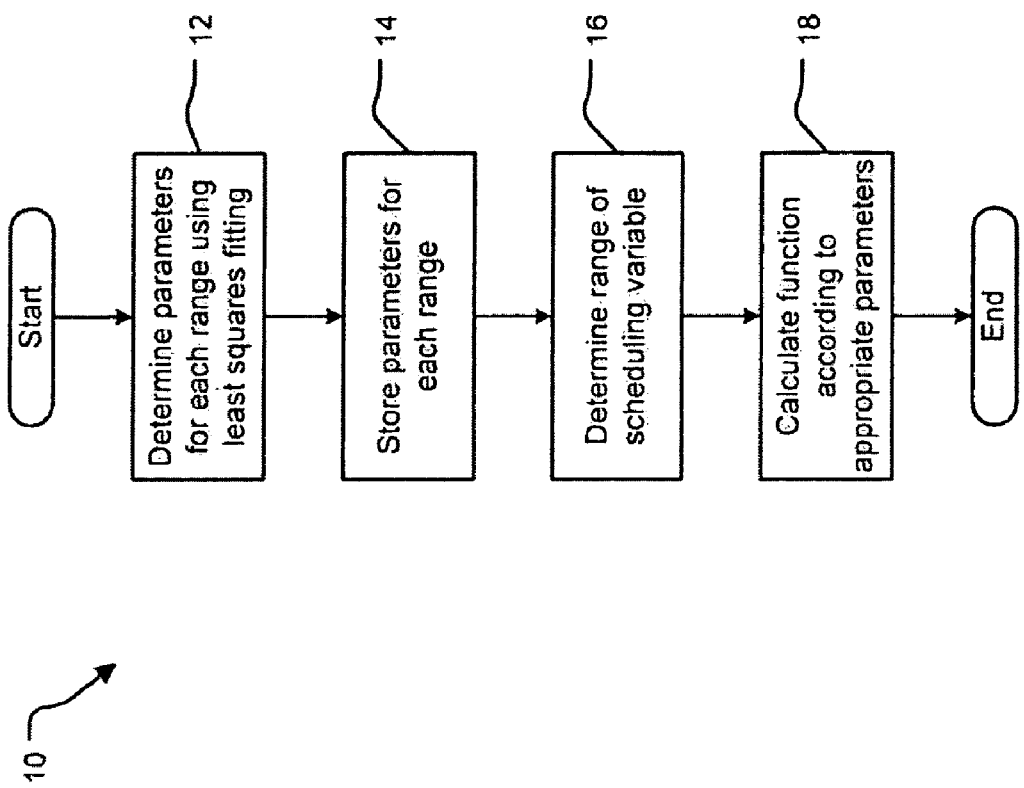
FIG. 1 is a flow diagram that illustrates a control method that schedules a function using linear splines according to the present invention.

The following description of the preferred embodiment(s) is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, and/or other suitable components that provide the described functionality.

The present invention permits the application of linear control design methods to non-linear systems. Linear spline scheduling provides a practical, generic method for modeling non-linear systems as scheduled, linear systems. More specifically, this invention relates to the application of linear splines to internal combustion engine control. Linear splines schedule the parameters of a linear system to represent the nonlinear behavior typically seen in internal combustion engine control systems.

Linear spline scheduling permits a "dual" formulation of system behavior that is computationally efficient while still preserving the transparency of the relationship between system parameters and system performance. A first formulation is linear in its parameters, thereby permitting the use of least squares identification. An algebraically equivalent second formulation allows a computationally efficient implementation of control laws. The dual formulations present a transparent relationship between system parameters and system behavior that makes the application of extensions to standard linear design theory relatively straightforward. As such, designers can apply standard linear design methods to systems scheduled via linear splines.

In a first implementation, the linear spline method is applied to a one-dimensional scheduled filter. A filter coefficient $\alpha$ is a function of a single variable, such as coolant temperature (TCO). The filter coefficient $\alpha$ is formulated according to linear splines as:

$$\alpha = c_0 + \sum_{i=1}^{n} c_i \times UTCO(i) \quad \text{(Equation 1)}$$

where $$UTCO(i) = \begin{cases} 0 & \text{if } TCO \leq TCO_i \\ TCO - TCO_i & \text{otherwise} \end{cases}.$$

UTCO(i) is a basis function that is a function of TCO. The basis function determines an output value according to a range defined by $TCO_i$. $TCO_i$ indicates a beginning of a data range. In terms of linear spline formulation, $TCO_i$ is a linear spline "knot." The terms $c_0$ and $c_i$ are constants. The filter coefficient formulation is piecewise linear. As such, a first slope of the filter coefficient $\alpha$ is linear between linear spline knots $TCO_i$ and $TCO_{i+1}$. Similarly, a second slope of the filter coefficient $\alpha$ is linear between linear spline knots $TCO_{i+1}$ and $TCO_{i+2}$. However, the slope of the filter coefficient $\alpha$ changes at each linear spline knot.

Because the filter coefficient equation is linear in its parameters $c_0$ and $c_i$, the parameters in Equation 1 can easily be fit with standard least squares fitting methods as are known in the art. In other words, after first defining data ranges, the least squares fitting method is used to determine the parameters that define the slope in each data range (i.e. between successive linear splines knots) by fitting the coefficients in Equation 1. Consider:

$$R_i = [TCO_i, TCO_{i+1}) \; i=1,2,\ldots n-1$$

$$R_n = [TCO_n, \infty)$$

where $R_i$ is a data range. When $TCO \in R_i$, the filter coefficient function can be rewritten as $$\alpha = \delta_0 + \delta_1 \times TCO \quad \text{(Equation 2)},$$

where $$\delta_0 = c_0 - \sum_{m=1}^{i} c_m \times TCO_m$$

and $$\delta_1 = \sum_{m=1}^{i} c_m.$$

In other words, Equation 2 formulates the filter coefficient $\alpha$ as a standard linear equation for each TCO data range $R_i$. Equation 2 is algebraically equivalent to Equation 1.

A control method 10 implements a filter coefficient schedule according to Equation 2 as shown in FIG. 1. In step 12, the method 10 determines the terms $\delta_0$ and $\delta_1$ for each temperature range $R_i$ by using least squares fitting to find the parameters in Equation 1, and performing arithmetic detailed by Equation 2. In step 14, the terms $\delta_0$ and $\delta_1$ are stored for each temperature range $R_i$. For example, the terms $\delta_0$ and $\delta_1$ are stored in memory of a control module that implements the control method 10. In step 16, the method 10 determines which range the scheduling variable TCO is in. In step 18, the method 10 calculates $\alpha$ according to Equation 2 using the appropriate $\delta_0$ and $\delta_1$ terms. Those skilled in the art can appreciate that this implementation requires only a single multiply ($\delta_1 \times TCO$) and a single addition ($\delta_0 + \delta_1 \times TCO$) to calculate. A comparable interpolation from a one-dimensional table requires significantly more mathematical operations. For one-dimensional implementations, there is no loss in accuracy. Therefore, the linear spline method as described above is as accurate as a one-dimensional table lookup method if the number of knots in the linear spline formulation is equivalent to a number of entries in the interpolation table.

In a second implementation, the linear spline method is applied to a two-dimensional volumetric efficiency (VE) function. The VE function is scheduled as a function of manifold absolute pressure (MAP) and engine speed in rotations per minute (RPM). VE is formulated according to linear splines as:

$$VE = c_0 + \sum_{i=1}^{n} a_i \times UMAP(i) + \sum_{j=1}^{m} b_j \times URPM(j)$$

where $$UMAP(i) = \begin{cases} 0 & \text{if } MAP \leq MAP_i \\ MAP - MAP_i & \text{otherwise} \end{cases}$$

and $$URPM(j) = \begin{cases} 0 & \text{if } RPM \leq RPM_j \\ RPM - RPM_j & \text{otherwise} \end{cases}.$$

UMAP(i) and URPM(j) are basis functions as described with respect to the one-dimensional filter coefficient application. The basis functions determine output values according to ranges defined by $MAP_i$ and $RPM_j$, or the linear spline knots for MAP and RPM, respectively. The terms $c_0$, $a_i$, and $b_j$ are constants. Therefore, the least squares fitting method can be used to fit the parameters.

The linear spline knots are used to define ranges for least squares fitting as described below:

$$R_{i,j} = \{[MAP_i, MAP_{i+1}), [RPM_j, RPM_{j+1})\} \; i=1,2,\ldots$$
$$n-1 \; j=1,2,\ldots m-1,$$

$$R_{n,j} = \{[MAP_n, \infty), [RPM_j, RPM_{j+1})\} \; j=1,2,\ldots m-1,$$

$$R_{i,m} = \{[MAP_i, MAP_{i+1}), [RPM_m, \infty)\} \; i=1,2,\ldots n-1,$$
and $$R_{n,m} = \{[MAP_n, \infty), [RPM_m, \infty)\}.$$

When $(MAP, RPM) \in R_{i,j}$, the VE function can be rewritten as $$VE = \delta_0 + \delta_1 \times MAP + \delta_2 \times RPM, \quad \text{(Equation 3)}$$

where $$\delta_0 = c_0 - \sum_{k=1}^{i} a_k \times MAP_k - \sum_{k=1}^{j} b_k \times RPM_k,$$

$$\delta_1 = \sum_{k=1}^{i} a_k, \text{ and } \delta_2 = \sum_{k=1}^{j} b_k.$$

In other words, Equation 3 formulates VE as a standard linear equation for each data range. Those skilled in the art can appreciate that a control method as described in FIG. 1 can be used to implement the VE function according to Equation 3. This implementation requires only two multiplications and two additions to calculate. A comparable interpolation from a two-dimensional table requires significantly more mathematical operations. Unlike the one-dimensional filter coefficient case, however, there is a small loss in accuracy. The numerical efficiency of linear spline method compared to table lookup increases with the dimensionality of the problem while the accuracy decreases.

In a third implementation, the linear spline method is applied to a two-dimensional VE function with a cross term. The VE function is still scheduled as a function of MAP and RPM. However, the VE is modeled with a cross term as described below. VE as a function of MAP and RPM with a cross term is formulated according to linear splines as:

$$VE = c_0 + \sum_{i=1}^{N} a_i \times UMAP(i) + \sum_{j=1}^{m} b_j \times URPM(j) +$$
$$\sum_{j=1}^{m} d_j \times MAP \times URPM(j) + \sum_{i=1}^{n} e_i \times RPM \times UMAP(i)$$

where $$UMAP(i) = \begin{cases} 0 & \text{if } MAP \leq MAP_i \\ MAP - MAP_i & \text{otherwise} \end{cases}$$

and $$URPM(j) = \begin{cases} 0 & \text{if } RPM \leq RPM_j \\ RPM - RPM_j & \text{otherwise} \end{cases}.$$

As with previously described implementations, the parameters are constant within each range of MAP and RPM. Therefore, the least squares fitting method can be used to fit the parameters. Linear spline knots are used to define ranges for least squares fitting as described below:

$$R_{i,j} = \{[MAP_i, MAP_{i+1}), [RPM_j, RPM_{j+1})\} \; i=1,2,\ldots$$
$$n-1 \; j=1,2,\ldots m-1,$$

$$R_{n,j} = \{[MAP_n, \infty), [RPM_j, RPM_{j+1})\} \; j=1,2,\ldots m-1,$$

$$R_{i,m} = \{[MAP_i, MAP_{i+1}), [RPM_m, \infty)\} \; i=1,2,\ldots n-1,$$

and $R_{n,m} = \{[MAP_n, \infty), [RPM_m, \infty)\}.$

When $(MAP, RPM) \in R_{i,j}$, the VE function can be rewritten as $$VE = \delta_0 + \delta_1 \times MAP + \delta_2 \times RPM + \quad \text{(Equation 4)}$$
$$\delta_3 \times MAP \times RPM,$$

where $$\delta_0 = c_0 - \sum_{k=1}^{i} a_k \times MAP_k - \sum_{k=1}^{j} b_k \times RPM_k,$$

$$\delta_1 = \sum_{k=1}^{i} a_k - \sum_{k=1}^{j} d_j \times RPM_j,$$

$$\delta_2 = \sum_{k=1}^{j} b_k - \sum_{k=1}^{i} e_k \times MAP_i,$$

and $\delta_3 = \sum_{k=1}^{i} d_k + \sum_{k=1}^{j} e_k.$

Those skilled in the art can appreciate that a control method as described with respect to the first and second implementations can be used to implement the VE function according to Equation 4. This implementation requires only three multiplications and three additions to calculate. A comparable interpolation from a two-dimensional table requires significantly more mathematical operations. Additionally, this implementation can be extended to more complicated polynomic formulations. In particular, the addition of quadratic terms to model VE with a scheduled, generalized quadratic equation follows directly since a square of MAP or RPM is the same as crossing MAP or RPM with itself.

Figure 2A:
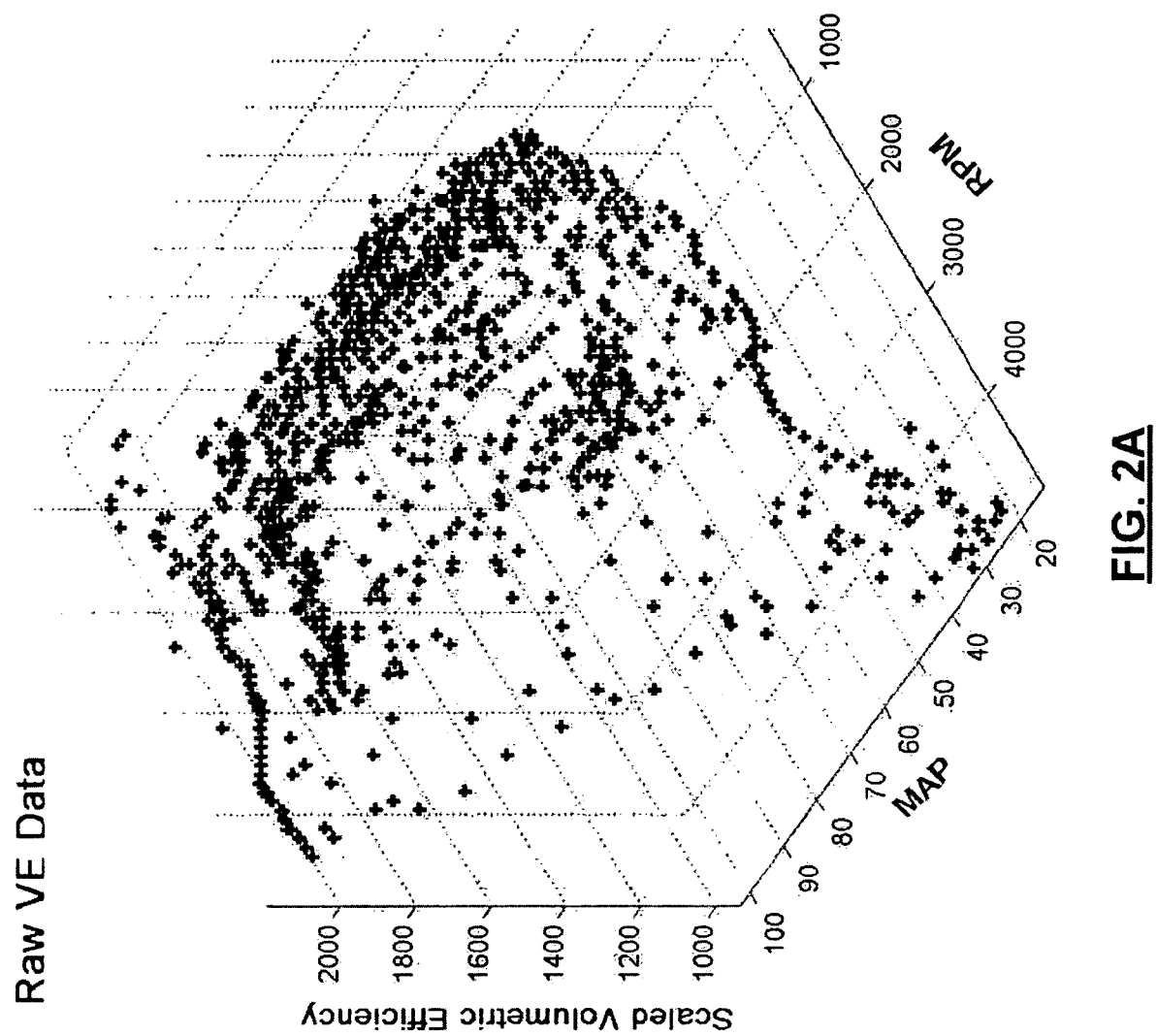
FIG. 2A is a three-dimensional graphical representation of a collection of data points according to the present invention.
Figure 2B:
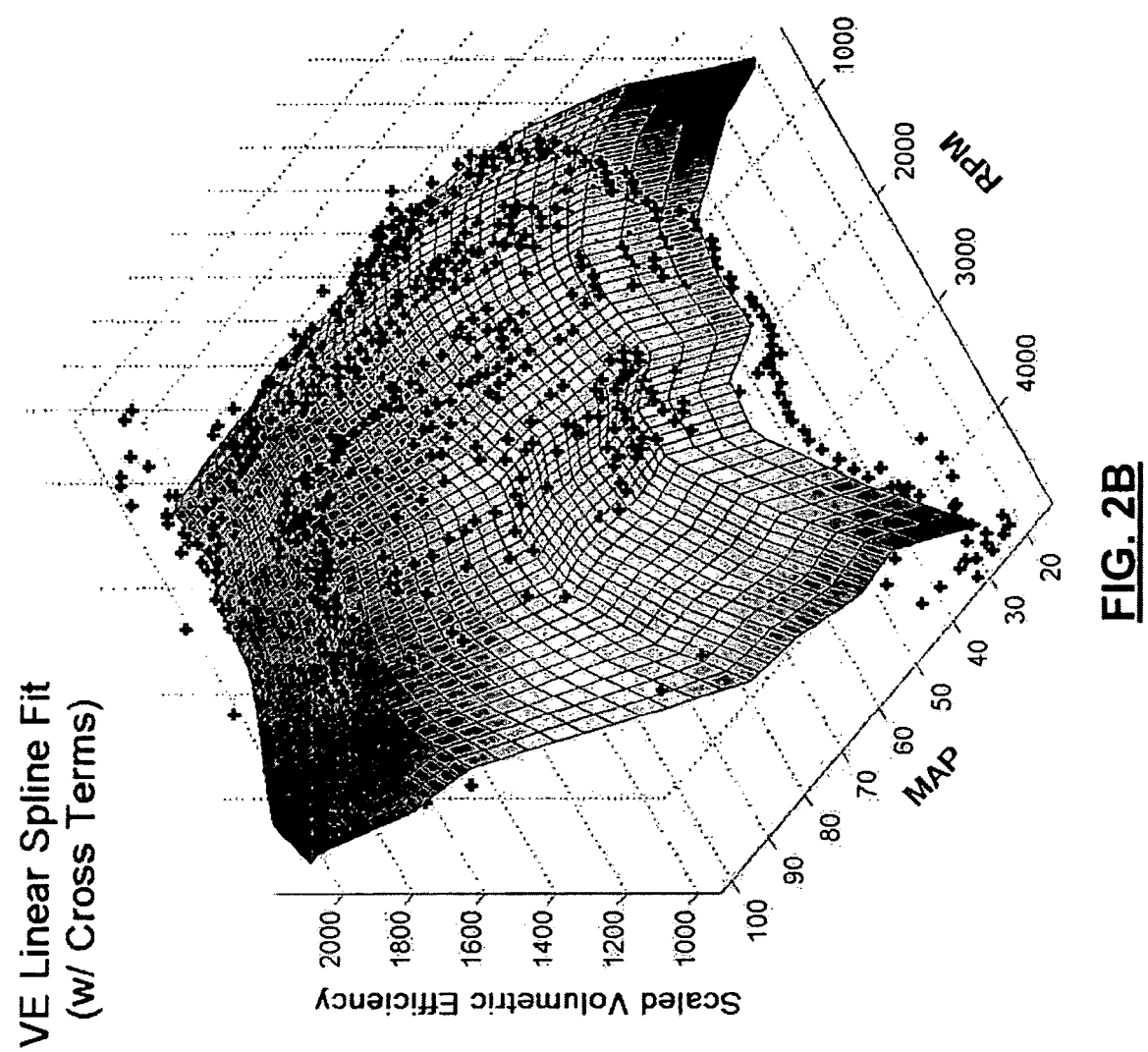
FIG. 2B is a three-dimensional graphical representation of a linear spline fit of a collection of data points according to the present invention.
Figure 2C:
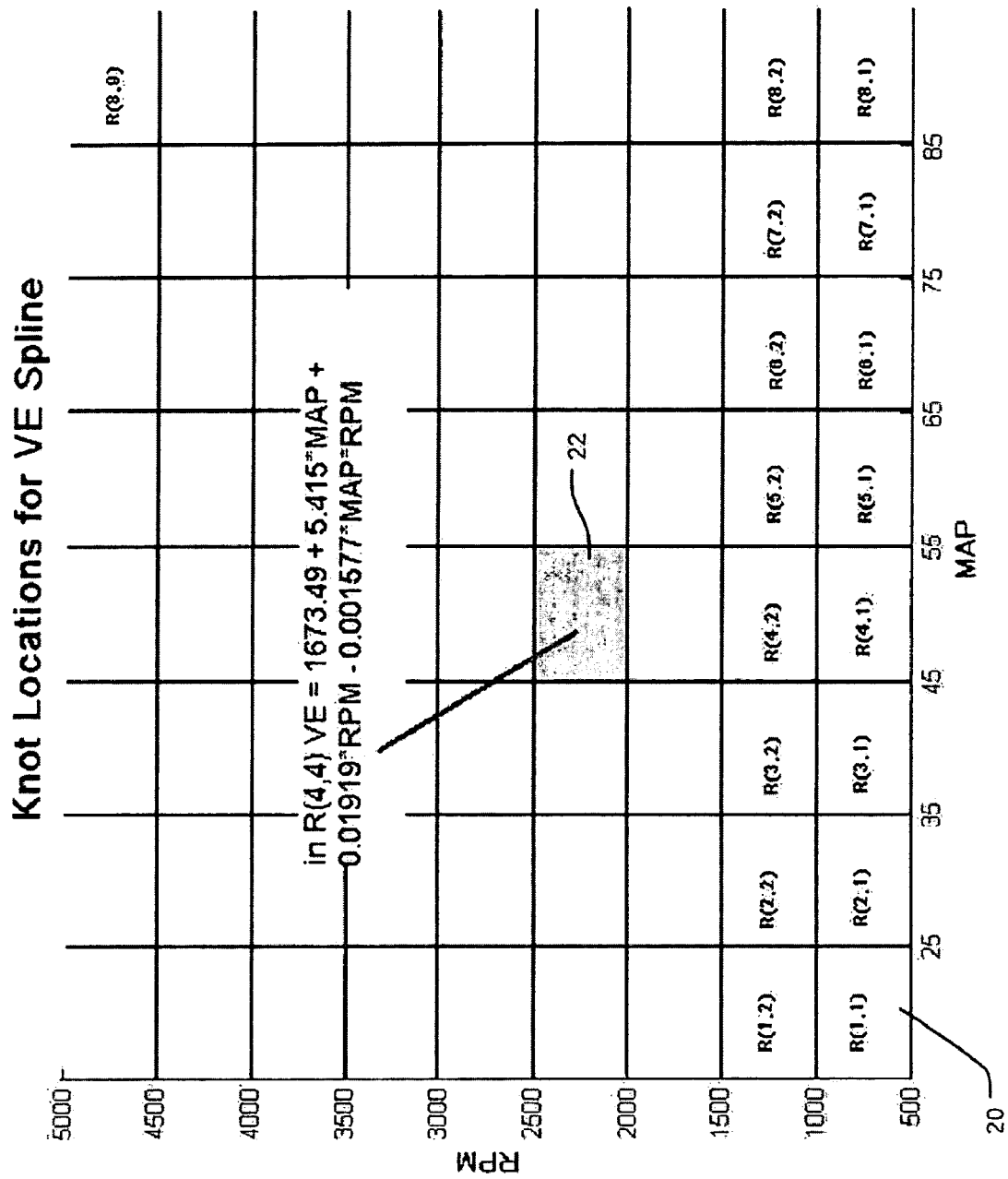
FIG. 2C is a graphical representation of data ranges defined by linear spline knots according to the present invention.

An exemplary demonstration of the linear spline method with respect to the VE function of the third implementation is shown in FIGS. 2A through 2C. Referring now to FIG. 2A, a collection of exemplary data points represent VE as a function of MAP and RPM with cross terms. Referring now to FIG. 2B, the data points from FIG. 2A are shown with a linear spline fit representation. Referring now to FIG. 2C, a knot location plot demonstrates data ranges for values of RPM and MAP. For example, a first range 20 is defined by RPM between 500 and 1000 and by MAP between 0 and 25 KPa. In other words, for the first range 30, 500 and 1000 are the linear spline knots for RPM. Similarly, 0 and 25 are the linear spline knots for MAP. A second range 22 is defined by RPM knots of 2000 and 2500 and by MAP knots of 45 and 55 KPa. In the second range 22, VE is determined according to Equation 4:

$$VE = 1673.49 + 5.415 \times MAP + 0.01919 \times RPM -$$
$$0.001577 \times MAP \times RPM,$$

where the values of the parameters are determined according to the above description of the third implementation.

In a fourth implementation, the linear spline method is applied to a three-dimensional lost fuel (% LF) function. The lost fuel function is scheduled as a function of MAP, RPM, and TCO. This implementation is described in more detail in U.S. patent application Ser. No. 60/672,592, filed on Apr. 19, 2005 which is hereby incorporated by reference in its entirety. % LF is formulated according to linear splines as:

$$\%LF = c_0 + \sum_{i=1}^{n} a_i \times UMAP(i) + \sum_{j=1}^{m} b_j \times URPM(j) + \sum_{k=1}^{o} d_k UTCO(k)$$

where $$UMAP(i) = \begin{cases} 0 & \text{if } MAP \le MAP_i \\ MAP - MAP_i & \text{otherwise} \end{cases},$$

$$URPM(j) = \begin{cases} 0 & \text{if } RPM \le RPM_j \\ RPM - RPM_j & \text{otherwise} \end{cases},$$

and $$UTCO(k) = \begin{cases} 0 & \text{if } TCO \le TCO_k \\ TCO - TCO_k & \text{otherwise} \end{cases}.$$

As with previously described implementations, the parameters are constant. Therefore, the least squares fitting method can be used to fit the parameters. Linear spline knots are used to define ranges for least squares fitting as described below:

$R_{i,j,k}=\{[MAP_i,MAP_{i+1}),[RPM_j,RPM_{j+1}),[TCO_k,TCO_{k+1})\}, i=1,2,\ldots n-1; j=1,2,\ldots m-1; k=1,2,\ldots o-1,$ $R_{n,j,k}=\{[MAP_n,\infty),[RPM_j,RPM_{j+1}),[TCO_k,TCO_{k+1})\}$
$j=1,2,\ldots m-1; k=1,2,\ldots o-1,$ $R_{i,m,k}=\{[MAP_i,MAP_{i+1}),[RPM_m,\infty),[TCO_k,TCO_{k+1})\}$
$i=1,2,\ldots n-1; k=1,2,\ldots o-1,$ $R_{i,j,o}=\{[MAP_i,MAP_{i+1}),[RPM_j,RPM_{j+1}),[TCO_o,\infty)\}$
$i=1,2,\ldots n-1; j=1,2,\ldots m-1,$ $R_{n,m,k}=\{[MAP_n,\infty),[RPM_m,\infty),[TCO_k,TCO_{k+1})\}\ k=1,2,\ldots o-1,$ $R_{n,j,o}=\{[MAP_n,\infty),[RPM_j,RPM_{j+1}),[TCO_o,\infty)\}$
$j=1,2,\ldots m-1,$ $R_{i,m,o}=\{[MAP_i,MAP_{i+1}),[RPM_m,\infty),[TCO_o,\infty)\}$
$i=1,2,\ldots n-1,$ and $R_{n,m,o}=\{[MAP_n,\infty),[RPM_m,\infty),[TCO_o,\infty)\}.$ When $(MAP,RPM,TCO) \in R_{i,j,k}$, the lost fuel function can be rewritten as $$\%LF = \delta_0 + \delta_1 \times MAP + \delta_2 \times RPM + \delta_3 \times TCO \quad \text{(Equation 5)}$$

where $$\delta_0 = c_0 - \sum_{p=1}^{i} a_p \times MAP_p - \sum_{p=1}^{j} b_p \times RPM_p - \sum_{p=1}^{k} d_p \times TCO_p,$$

$$\delta_1 = \sum_{p=1}^{i} a_p, \delta_2 = \sum_{p=1}^{j} b_p, \text{ and } \delta_3 = \sum_{p=1}^{k} d_p.$$

Those skilled in the art can appreciate that a control method as described with respect to previous implementations can be used to implement the % LF function according to Equation 5. This implementation requires only three multiplications and three additions to calculate. A comparable interpolation from a three-dimensional table requires significantly more mathematical operations.

In a fifth implementation, the linear spline method is applied to a four-dimensional VE function scheduled as a function of MAP, RPM, intake cam position (INT), and exhaust cam position (EXH). VE as a function of MAP, RPM, INT, and EXH is formulated according to linear splines as:

$$VE = c_0 + \sum_{i=1}^{n} a_i \times UMAP(i) + \sum_{j=1}^{m} b_j \times URPM(j) + \sum_{k=1}^{o} d_k \times UINT(k) + \sum_{l=1}^{p} e_l \times UEXH(l)$$

where $$UMAP(i) = \begin{cases} 0 & \text{if } MAP \le MAP_i \\ MAP - MAP_i & \text{otherwise} \end{cases},$$

$$URPM(j) = \begin{cases} 0 & \text{if } RPM \le RPM_j \\ RPM - RPM_j & \text{otherwise} \end{cases},$$

$$UINT(k) = \begin{cases} 0 & \text{if } INT \le INT_k \\ INT - INT_k & \text{otherwise} \end{cases},$$

and $$UEXH(l) = \begin{cases} 0 & \text{if } EXH \le EXH_l \\ EXH - EXH_l & \text{otherwise} \end{cases}.$$

As with previously described implementations, the parameters are constant. Therefore, the least squares fitting method can be used to fit the parameters. Linear spline knots are used to define ranges for least squares fitting as described below:

$R_{i,j,k,l}=\{[MAP_i,MAP_{i+1}),[RPM_j,RPM_{j+1}),[INT_k,INT_{k+1}),[EXH_l,EXH_{l+1})\}, i=1,2,\ldots n-1; j=1,2,\ldots m-1; k=1,2,\ldots o-1; l=1,2,\ldots p-1,$ $R_{n,j,k,l}=\{[MAP_n,\infty),[RPM_j,RPM_{j+1}),[INT_k,INT_{k+1}),[EXH_l,EXH_{l+1})\}, j=1,2,\ldots m-1, k=1,2,\ldots o-1, l=1,2,\ldots p-1,$ $R_{i,m,o,p} = \{[MAP_i, MAP_{i+1}), [RPM_m, \infty), [INT_o, \infty), [EXH_p, \infty)\} i=1,2, \ldots n-1,$ and $R_{n,m,o,p} = \{[MAP_n, \infty), [RPM_m, \infty), [INT_o, \infty), [EXH_p, \infty)\}.$ When $(MAP, RPM, INT, EXH) \in R_{i,j,k,l}$, the volumetric efficiency function can be rewritten as $$VE = \delta_0 + \delta_1 \times MAP + \delta_2 \times RPM + \delta_3 \times INT + \delta_4 \times EXH \qquad \text{(Equation 6)}$$

where $$\delta_0 = c_0 - \sum_{q=1}^{i} a_q \times MAP_q - \sum_{q=1}^{j} b_q \times RPM_q - \sum_{p=1}^{k} d_q \times INT_q - \sum_{q=1}^{l} e_q \times EXH_q,$$

$$\delta_1 = \sum_{q=1}^{i} a_q, \; \delta_2 = \sum_{q=1}^{j} b_q, \; \delta_3 = \sum_{q=1}^{k} d_q,$$

and $\delta_4 = \sum_{q=1}^{l} e_q.$

Those skilled in the art can appreciate that a control method as described with respect to previous implementations can be used to implement the VE function according to Equation 6. This implementation requires only four multiplications and four additions to calculate.

The present implementation for the VE function as described above demonstrates that the linear spline method allows parameterization that can be extended to other well-known linear design methods. For example, one problem associated with using high dimension schedules for certain functions is determining where to place break points (i.e. linear spline knots, table cell boundaries, etc.). However, because the linear spline method provides a formulation that is linear in its parameters, standard least squares fitting can be used for such problems. In one implementation, an excessive number of knots can be selected. Subsequently, standard least squares fitting or step-wise regression can be used to determine the best (i.e. reduced) set of knots. This method is particularly effective for problems such as the VE function where the curvature of the function is not known.

In a sixth implementation, the linear spline method is applied to a compound two-dimensional/one-dimensional fuel dynamics model coefficient α that is scheduled as a function of MAP and RPM. Further, the MAP and RPM coefficients are scheduled as a function of TCO. This implementation is motivated by U.S. patent application Ser. No. 60/672,592 as referenced above with respect to the fourth implementation. The fuel dynamics model coefficient α as a function of MAP, RPM, and TCO is formulated according to linear splines as:

$$\alpha = c_0 + \sum_{i=1}^{n} a_i \times UMAP(i) + \sum_{j=1}^{m} b_j \times URPM(j)$$

where $$UMAP(i) = \begin{cases} 0 & \text{if } MAP \leq MAP_i \\ MAP - MAP_i & \text{otherwise} \end{cases}$$

and $$URPM(j) = \begin{cases} 0 & \text{if } RPM \leq RPM_j \\ RPM - RPM_j & \text{otherwise} \end{cases}.$$

Here, however, each term $c_0$, $a_i$ and $b_j$ is a function of TCO:

$$c_0 = d_0 + \sum_{k=1}^{p} d_k \times UTCO(k),$$

$$a_i = e_{i,0} + \sum_{k=1}^{p} e_{i,k} \times UTCO(k),$$

and $$b_j = f_{j,0} + \sum_{k=1}^{p} f_{j,k} \times UTCO(k),$$

where $$UTCO(k) = \begin{cases} 0 & \text{if } TCO \leq TCO_k \\ TCO - TCO_k & \text{otherwise} \end{cases}.$$

As with previously described implementations, the least squares fitting method can be used to fit the parameters. Linear spline knots are used to define ranges for least squares fitting as described below:

$R_{i,j,k} = \{[MAP_i, MAP_{i+1}), [RPM_j, RPM_{j+1}), [TCO_k, TCO_{k+1})\}$ $i=1,2, \ldots n-1; j=1,2, \ldots m-1; k=1, 2, \ldots p-1,$ $R_{n,j,k} = \{[MAP_n, \infty), [RPM_j, RPM_{j+1}), [TCO_k, TCO_{k+1})\}$ $j=1,2, \ldots m-1; k=1,2, \ldots p-1,$ $R_{i,m,k} = \{[MAP_i, MAP_{i+1})[RPM_m, \infty), [TCO_k, TCO_{k+1})\}$ $i=1,2, \ldots n-1; k=1,2, \ldots p-1,$ $R_{i,j,p} = \{[MAP_i, MAP_{i+1}), [RPM_j, RPM_{j+1}), [TCO_p, \infty)\}$ $i=1,2, \ldots n-1; j=1,2, \ldots m-1,$ $R_{n,m,k} = \{[MAP_n, \infty), [RPM_m, \infty), [TCO_k, TCO_{k+1})\} k=1, 2, \ldots p-1,$ $R_{n,j,p} = \{[MAP_n, \infty), [RPM_j, RPM_{j+1}), [TCO_p, \infty)\} j=1, 2, \ldots m-1,$ and $R_{n,m,p} = \{[MAP_n, \infty), [RPM_m, \infty), [TCO_p, \infty)\}$ When $(MAP, RPM, TCO) \in R_{i,j,k}$, the fuel dynamics model coefficient, α, can be rewritten as $$\alpha = (\delta_0 + \delta_1 \times TCO) + (\delta_2 + \delta_3 \times TCO) \times MAP + (\delta_4 + \delta_5 \times TCO) \times RPM \qquad \text{(Equation 7)}$$

where

-continued $$\delta_0 = d_0 - \sum_{q=1}^{k} d_q \times TCO_q - \sum_{r=1}^{i}\left(\left(e_{r,0} - \sum_{q=1}^{k} e_{r,q} \times TCO_q\right) \times MAP_r\right) - \sum_{r=1}^{j}\left(\left(f_{r,0} - \sum_{q=1}^{k} f_{r,q} \times TCO_q\right) \times RPM_r\right),$$

$$\delta_1 = \sum_{q=1}^{k} d_q - \sum_{r=1}^{i}\left(\left(\sum_{q=1}^{k} e_{r,q}\right) \times MAP_r\right) - \sum_{r=1}^{j}\left(\left(\sum_{q=1}^{k} f_{r,q}\right) \times RPM_r\right),$$

$$\delta_2 = \sum_{r=1}^{i}\left(e_{r,0} - \sum_{q=1}^{k} e_{r,q} \times TCO_q\right),$$

$$\delta_3 = \sum_{r=1}^{i}\sum_{q=1}^{k} e_{r,q},$$

$$\delta_4 = \sum_{r=1}^{j}\left(f_{r,0} - \sum_{q=1}^{k} f_{r,q} \times TCO_q\right),$$

and $$\delta_5 = \sum_{r=1}^{j}\sum_{q=1}^{k} f_{r,q}.$$

Those skilled in the art can appreciate that a control method as described with respect to previous implementations can be used to implement the fuel dynamics model coefficient α function according to Equation 7. This implementation requires only five multiplications and five additions per coefficient, ax, to calculate.

Figure 3:
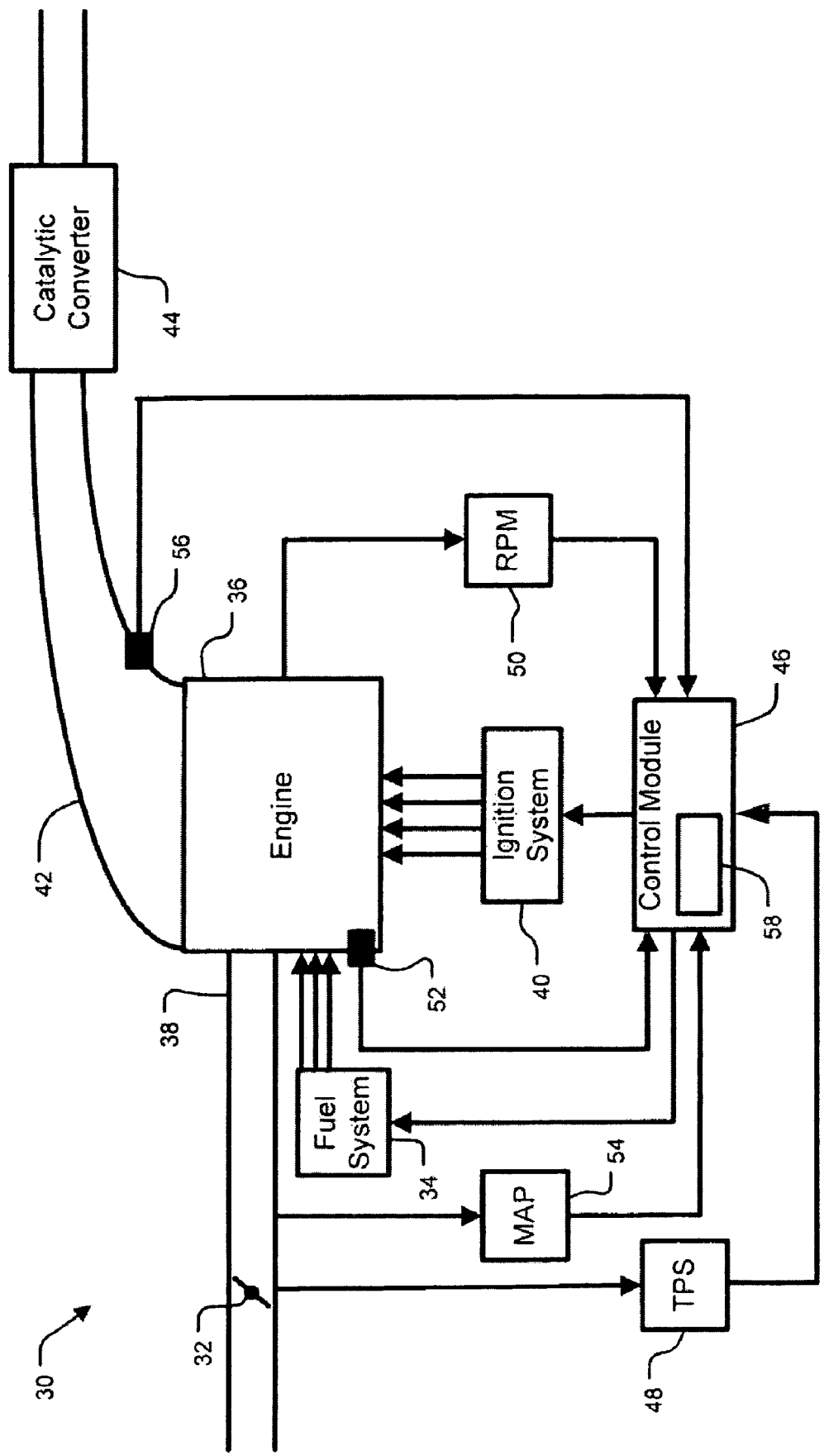
FIG. 3 is a functional block diagram of an engine control system that implements a linear spline method according to the present invention.

Referring now to FIG. 3, an engine control system 30 that implements the linear spline method of the present invention is shown. A throttle 32 and fuel system 34 determine air and fuel delivered to an engine 36 through an intake manifold 38. An ignition system 40 ignites an air/fuel mixture in the engine 36. Exhaust gas created by the ignition of the air/fuel mixture is expelled through the exhaust manifold 42. The catalytic converter 44 receives the exhaust gas and reduces emissions levels of the exhaust gas.

A control module 46 communicates with various components of the engine control system 30, including, but not limited to, a throttle position sensor 48 (TPS), the fuel system 34, the ignition system 40, and an engine speed sensor 50 (RPM). The control module 46 receives a throttle position signal from the TPS 48 and determines air flow into the engine 36. The air flow data is then used to calculate fuel delivery from the fuel system 34 to the engine 36. The control module 46 further communicates with the ignition system 40 to determine ignition spark timing.

The control module 46 may receive additional signals from other components in the engine control system 30. The control module 46 receives an engine coolant temperature from an engine coolant temperature sensor 52. The control module 46 receives an engine speed from the engine speed sensor 50. The control module 46 receives MAP from a MAP sensor 54. The control module 46 receives a measured burned fuel mass from an exhaust sensor 56. These and other variables may affect the overall performance and behavior of the engine control system 30.

The control module 46 includes a memory 58 that stores data for implementing the linear spline method. For example, the memory 58 stores Equations 2 through 7 as described above, as well as values for the parameters of each equation and each data range. The control module 46 receives values of the variables of the Equations from the engine control system 30 such as RPM, MAP, and TCO. The control module 46 calculates the Equations according to the stored parameters and the received values.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A control system for a vehicle comprising:
a first module that determines an engine performance parameter;
a memory module that stores a linear equation that represents an engine control parameter for a range of values of the engine performance parameter, and that stores at least one equation parameter value of the linear equation, wherein the range of values are defined by linear spline knots; and
a control module that communicates with the first module and determines whether the engine performance parameter is within the range of values, and that calculates the engine control parameter according to the linear equation and the at least one equation parameter value when the engine performance parameter is within the range of values.

2. The control system of claim 1 wherein the engine performance parameter is one of manifold absolute pressure, engine coolant temperature, and/or engine speed.

3. The control system of claim 1 wherein the engine control parameter is one of a filter coefficient, volumetric efficiency, and/or lost fuel.

4. The control system of claim 1 wherein the control module controls at least one engine function according to the engine control parameter.

5. The control system of claim 1 wherein the at least one equation parameter values are determined according to least squares fitting.

6. A modeling system for a control parameter of a vehicle comprising:
a first model that formulates the control parameter in terms of linear spline basis functions, coefficients, and knots;
a second model that is derived according to the first model, that includes coefficients that are derived according to the linear spline basis functions, coefficients, and knots, and that forms a linear equation for the control parameter;
a memory module that stores the linear equation; and
a control module that calculates the control parameter according to the linear equation.

7. The modeling system of claim 6 wherein the first model includes at least one engine parameter.

8. The modeling system of claim 7 wherein the first model determines linear spline knots for a range of values of the at least one engine parameter.

9. The modeling system of claim 8 wherein the second model is derived at least in part according to least squares fitting.

10. The modeling system of claim 8 wherein the memory module stores an equation parameter value of at least one variable of the linear equation for each range of values of the at least one engine parameter.

11. The modeling system of claim 10 wherein the control module calculates the control parameter according to the linear equation and the equation parameter value.

12. The modeling system of claim 6 wherein the control module controls at least one engine performance function according to the control parameter.

13. A linear spline modeling method for a vehicle control parameter comprising:

determining a first equation that represents the vehicle control parameter in terms of linear spline, basis functions, coefficients, and knots and that defines a value of an engine parameter for a first data range;

determining at least one parameter of a second equation for the first data range according to the linear spline basis functions, coefficients, and knots; and calculating the vehicle control parameter according to the second equation and the at least one parameter.

14. The method of claim 13 further comprising:

storing values of the at least one parameter for the first data range;

determining whether the at least one parameter is within the first data range; and calculating the vehicle control parameter according to the second equation and the at least one parameter when the at least one parameter is within the data range.

15. The method of claim 13 further comprising controlling an engine function according to the vehicle control parameter.

* * * * *